United States Patent [19]

Yoerger

[11] Patent Number: 5,411,832
[45] Date of Patent: May 2, 1995

[54] METHOD OF MODIFYING THE CHARGING PROPENSITY OF CARRIER PARTICLES FOR ELECTROSTATOGRAPHIC DEVELOPERS AND MODIFIED CARRIER PARTICLES

[75] Inventor: William E. Yoerger, Rochester, N.Y.

[73] Assignee: Eastman Kodak Company, Rochester, N.Y.

[21] Appl. No.: 127,382

[22] Filed: Sep. 24, 1993

[51] Int. Cl.⁶ .............................................. G03G 9/10
[52] U.S. Cl. .................................................. 430/108
[58] Field of Search ........................ 430/106, 110, 108

[56] References Cited

U.S. PATENT DOCUMENTS

| Re. 31,072 | 11/1982 | Jadwin et al. | 430/99 |
|---|---|---|---|
| 3,970,571 | 7/1976 | Olson et al. | 252/62.1 |
| 4,042,518 | 8/1977 | Jones | 252/62.1 |
| 4,076,857 | 2/1978 | Kasper et al. | 427/18 |
| 4,089,472 | 5/1978 | Siegel et al. | 241/5 |
| 4,160,644 | 7/1979 | Ryan | 23/230 B |
| 4,394,430 | 7/1983 | Jadwin et al. | 430/110 |
| 4,414,152 | 11/1983 | Santilli et al. | 260/185 |
| 4,416,965 | 11/1983 | Sandhu et al. | 430/109 |
| 4,478,925 | 10/1984 | Miskinis | 430/137 |
| 4,517,272 | 5/1985 | Jadwin et al. | 430/110 |
| 4,546,060 | 10/1985 | Miskinis et al. | 430/108 |
| 4,684,596 | 8/1987 | Bonser et al. | 430/110 |
| 4,726,994 | 2/1988 | Yoerger | 428/403 |
| 4,737,435 | 4/1988 | Yoerger | 430/137 |
| 4,758,491 | 7/1988 | Alexandrovich et al. | 430/110 |
| 4,833,060 | 5/1989 | Nair et al. | 430/137 |
| 5,192,637 | 3/1993 | Saito et al. | 430/109 |

FOREIGN PATENT DOCUMENTS 04184456 of 0000 Japan.

OTHER PUBLICATIONS

H. Kise et al, *Journal of Polymer Science: Polymer Chemistry Edition*, vol. 21 (1983), pp. 3443-3451.

*Primary Examiner*—John Goodrow
*Attorney, Agent, or Firm*—Robert Luke Walker

[57] ABSTRACT

A method for modifying the triboelectric charging propensity of particles coated with fluorohydrocarbon polymer for use as carriers in electrostatographic development comprising contacting the particles with a basic solution including a reducing agent for said particles and optionally including an oxidizing agent for said particles and carriers and developers produced by that method.

24 Claims, 12 Drawing Sheets

FIG. 1  6 μm
FIG. 2  2 μm

FIG. 3     2 μm
FIG. 4     1 μm

FIG. 5    |— 6 μm —|
FIG. 6    |— 2 μm —|

FIG. 7  ⊢──┤ 2 μm
FIG. 8  ⊢──┤ 1 μm

FIG. 9  ⊢―――⊣ 6μm
FIG. 10  ⊢―――⊣ 2μm

FIG. 11　├─────┤ 2 μm
FIG. 12　├─────┤ 1 μm

FIG. 13   6 μm
FIG. 14   2 μm

FIG. 15  2μm
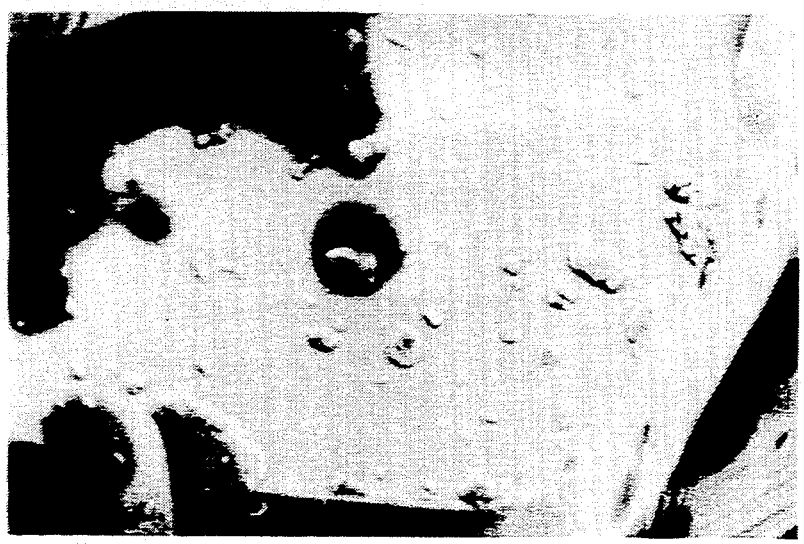
FIG. 16  1μm

FIG. 17  ⊢──── 6μm
FIG. 18  ⊢──── 2μm

FIG. 19  ⊢─── 2 μm ───⊣
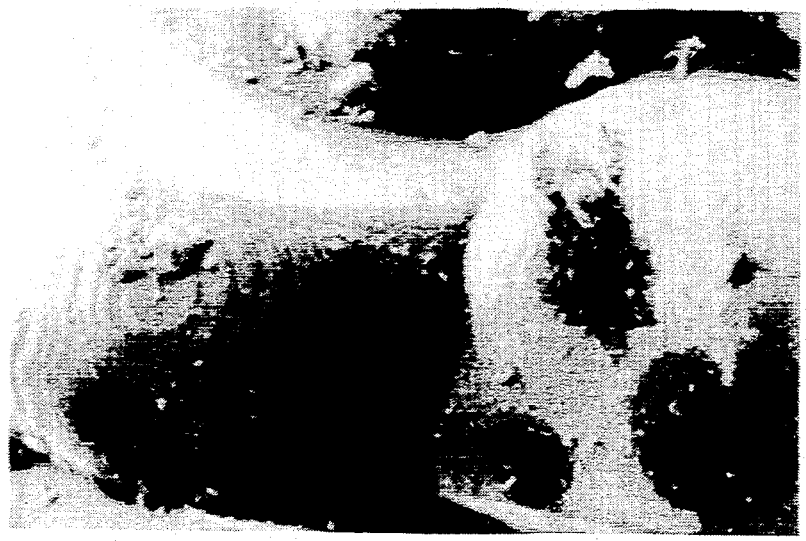
FIG. 20  ⊢─── 1 μm ───⊣

FIG. 21      6 μm
FIG. 22      2 μm

FIG. 23  ⊢──── 2 μm ────⊣
FIG. 24  ⊢──── 1 μm ────⊣

METHOD OF MODIFYING THE CHARGING PROPENSITY OF CARRIER PARTICLES FOR ELECTROSTATOGRAPHIC DEVELOPERS AND MODIFIED CARRIER PARTICLES

FIELD OF THE INVENTION

The invention relates to the preparation of carrier particles intended to be mixed with toner particles to form a dry electrostatographic developer. The invention more particularly relates to a method of modifying the triboelectric charging propensity of fluorocarbon coated particles.

BACKGROUND OF THE INVENTION

In electrostatography, image charge patterns are formed on a support and are developed by treatment with an electrostatographic developer containing marking particles which are attracted to the charge patterns. These particles are called toner particles or, collectively, toner. The image charge pattern, also referred to as an electrostatic latent image, is formed on an insulative surface of an electrostatographic element by any of a variety of methods. For example, the electrostatic latent image may be formed electrophotographically, by imagewise photo-induced dissipation of the strength of portions of an electrostatic field of uniform strength previously formed on the surface of an electrophotographic element comprising a photoconductive layer and an electrically conductive substrate. Alternatively, the electrostatic latent image may be formed by direct electrical formation of an electrostatic field pattern on a surface of a dielectric material.

One well-known type of electrostatographic developer comprises a dry mixture of toner particles and carrier particles. Developers of this type are employed in cascade and magnetic brush electrostatographic development processes. The toner particles and carrier particles differ triboelectrically, such that during mixing to form the developer, the toner particles acquire a charge of one polarity and the carrier particles acquire a charge of the opposite polarity. The opposite charges cause the toner particles to cling to the carrier particles. During development, the electrostatic forces of the latent image, sometimes in combination with an additional applied field, attract the toner particles. The toner particles are pulled away from the carrier particles and become electrostatically attached, in imagewise relation, to the latent image bearing surface. The resultant toner image can then be fixed, by application of heat or other known methods, depending upon the nature of the toner image and the surface, or can be transferred to another surface and then fixed.

A number of requirements are implicit in such development schemes. Namely, the electrostatic attraction between the toner and carrier particles must be strong enough to keep the toner particles held to the surfaces of the carrier particles while the developer is being transported to and brought into contact with the latent image, but when that contact occurs, the electrostatic attraction between the toner particles and the latent image must be even stronger, so that the toner particles are thereby pulled away from the carrier particles and deposited on the latent image-bearing surface.

Toner particles in many dry, two-component electrostatographic developers include a charge control agent. The charge control agent desirably, provides a high uniform net electrical charge to toner particles without reducing the adhesion of the toner to paper or other medium. Positive charge control agents, materials which impart a positive charge to toner particles in a developer, have been widely used and a great many are described in the published patent literature. In contrast, choices are more limited with negative charge control agents and negatively charging toners.

Carrier particles comprise a core material coated with a polymer. Commonly used polymers include: silicone resin; acrylic polymers, such as, poly(methylmethacrylate); and vinyl polymers, such as polystyrene and combinations of materials. Another commonly used coating material is fluorohydrocarbon polymer, such as poly(vinylidene fluoride) or poly(vinylidene fluoride-co-tetrafluoroethylene). See, for example, U.S. Pat. Nos. 4,546,060; 4,478,925; 4,076,857; and 3,970,571. Such polymeric fluorohydrocarbon carrier coatings can serve a number of known purposes. One such purpose can be to aid the developer to meet the electrostatic force requirements mentioned above by shifting the carrier particles to a position in the triboelectric series different from that of the uncoated carrier core material, in order to adjust the degree of triboelectric charging of both the carrier and the toner particles. Another purpose can be to reduce the frictional characteristics of the carrier particles in order to improve developer flow properties. Still another purpose can be to reduce the surface hardness of the carrier particles so that they are less likely to break apart during use and less likely to abrade surfaces, such as photoconductive element surfaces, that they contact during use. Yet another purpose can be to reduce the tendency of toner material or other developer additives to become undesirably permanently adhered to carrier surfaces during developer use (often referred to as "scumming"). A further purpose can be to alter the electrical resistance of the carrier particles. All of these, and even more, purposes are well known in the art for polymeric fluorohydrocarbon carrier coatings.

While such carrier coatings can serve all of the above-noted purposes well, in some cases the coatings do not adequately serve some or all of these purposes simultaneously. For example, in some developer compositions, polymeric fluorohydrocarbon carrier coatings can serve many of the above-noted purposes well, but, depending upon the nature of the toner particles and carrier core material desired to be included in the developer, such carrier coatings can cause the developer to acquire a triboelectric charge that is too high for optimum developer performance; that is, the electrostatic latent image has difficulty pulling the toner particles away from the carrier particles.

Various methods have been used to improve the characteristics of fluorocarbon coated carriers. U.S. Pat. No. 4,737,435 to Yoerger, disclosed a method of dehydrofluorinating a fluorohydrocarbon carrier coating by contacting the coated carrier particles with a basic solution. The resulting change in chemical structure had the effect of repositioning the carrier triboelectrically. U.S. Pat. No. 4,726,994 to Yoerger, disclosed a method of dehydrofluorinating and oxidizing a fluorohydrocarbon carrier coating by contacting the coated carrier particles with a basic solution and with an oxidizing agent. The resulting change in chemical structure also had the effect of repositioning the carrier triboelectrically, and in addition, decreased overcharging. Examples in both U.S. Pat. Nos. 4,737,435 and 4,726,994 are directed to positively charging developer (referring to the charge on the toner particles), that is, developer which contains negatively charging carrier.

There is a continuing need for negatively charging developers (developers in which toner charges negatively and carrier positively). The methods of U.S. Pat. Nos. 4,737,435 and 4,726,994 provide beneficial results when applied to negatively charging developers, however, those results are not optimal in all circumstances. For example, treatment with base and oxidizer may result in a toner charge that is excessively high. There is thus a continuing need for convenient methods for treating carrier particles to improve charging characteristics, which are applicable to negatively charging carrier.

SUMMARY OF THE INVENTION

The invention, in its broader aspects, provides a method for modifying the triboelectric charging propensity of particles coated with fluorohydrocarbon polymer for use as carriers in electrostatographic development. In the inventive method polyfluorohydrocarbon coated carrier is contacted with a basic solution including a reducing agent for the particles. The basic solution optionally includes an oxidizing agent for the particles. Improved carriers and developers are produced by the method of the invention.

It is an advantageous effect of at least some of the embodiments of the invention that methods for treating carrier particles are provided which improve charging characteristics of carriers, particularly negatively charging carriers.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein:

FIGS. 1-4 are low voltage, high magnification scanning electron micrographs of carrier of the invention prepared in accordance with the method of Example 9 (fluorohydrocarbon covered carrier particles treated with base and reducing agent). A dimension bar, in the form of a dashed line is provided at the bottom of each figure.

FIGS. 5-8 and 9-12 are low voltage, high magnification scanning electron micrographs of carrier of the invention prepared in accordance with the method of Examples 8a-8c and 10, respectively, (fluorohydrocarbon covered carrier particles treated with base, reducing agent and oxidizing agent). Relative ratios of reducing to oxidizing agent are 1 part to 2 parts for Examples 8a-8c and 1 part to 1 part for Example 10. A dimension bar, in the form of a dashed line is provided at the bottom of each figure.

FIGS. 13-16 are low voltage, high magnification scanning electron micrographs of carrier prepared in accordance with the method of Comparative Examples 1A-1C (untreated fluorohydrocarbon covered carrier particles). A dimension bar, in the form of a dashed line is provided at the bottom of each figure.

FIGS. 17-20 are low voltage, high magnification scanning electron micrographs of carrier prepared in accordance with the method of Comparative Examples 2A-2C (fluorohydrocarbon covered carrier particles treated with base). A dimension bar, in the form of a dashed line is provided at the bottom of each figure.

FIGS. 21-24 are low voltage, high magnification scanning electron micrographs of carrier prepared in accordance with the method of Comparative Examples 7A-7C, with the exception that the electron micrographs were taken after only one washing (fluorohydrocarbon covered carrier particles treated with base and oxidizing agent). A dimension bar, in the form of a dashed line is provided at the bottom of each figure.

DESCRIPTION OF PARTICULAR EMBODIMENTS

The term "particle size" used herein, or the term "size", or "sized" as employed herein in reference to the term "particles", means the median volume weighted diameter as measured by conventional diameter measuring devices, such as a Coulter Multisizer, sold by Coulter, Inc. of Hialeah, Fla. Median volume weighted diameter is the diameter of an equivalent weight spherical particle which represents the median for a sample.

The term "charge control" refers to a propensity of a toner addenda to modify the triboelectric charging properties of the resulting toner.

The term "glass transition temperature" or "$T_g$" as used herein means the temperature at which a polymer changes from a glassy state to a rubbery state. This temperature ($T_g$) can be measured by differential thermal analysis as disclosed in "Techniques and Methods of Polymer Evaluation", Vol. 1, Marcel Dekker, Inc., New York, 1966.

In the method of the invention, fluorohydrocarbon coated carrier particles are reacted with a reducing agent in a basic solution. In a preferred embodiment of the invention, the basic solution also surprisingly includes an oxidizing agent in addition to the reducing agent. The terms "reducing agent" and "oxidizing agent" as used herein refer to materials which would be regarded as such, in ordinary chemical usage. The reducing and oxidizing agents can be considered in relation to the untreated carrier particles; that is, the reducing agent should, at least theoretically reduce one or more components of the untreated carrier particles and the oxidizing agent should similarly oxidize one or more components. For the sake of convenience herein, this characteristic will be summarized by the phrase "reducing/oxidizing agent for the carrier particles". It should be understood, however, that while it is believed that both oxidation and reduction of the carrier particles (along with dehydrofluorination) are occurring in the method of the invention, the scope of the claimed invention is not limited by an particular theory or explanation of the claimed invention.

In carrying out the method of the invention, the coated carrier particles are brought into contact with base by mixing the untreated carrier particles with the basic solution. For the sake of convenience, the term "untreated carrier particles" is used herein to refer to carrier particles both before the initiation of treatment, that is, the initiation of the reaction with base and so on, and during the course of treatment. The term "treated carrier particles" is used to refer to particles for which the method of treatment of the invention has been completed.

It is believed that contacting the untreated carrier particles with base effects a spontaneous dehydrofluorination reaction of the base with the polymeric fluorohydrocarbon coatings. Dehydrofluorination of polymeric fluorohydrocarbons such as poly(vinylidene fluoride) by treatment with basic solutions is generally known in the chemical arts. It is known that when such treatments are applied to a polymeric fluorohydrocarbon in film form, the dehydrofluorination occurs mainly near the surface of the film that is contacted with the basic solution. See, for example, Kise, H. and Ogata, H., "Phase Transfer Catalysis in Dehydrofluorination of Poly(vinylidene Fluoride) by Aqueous Sodium Hydroxide Solutions", Journal of Polymer Science: Polymer Chemistry Edition, Vol. 21 (1983) pp. 3443–3451. This is believed to hold true for the method of the present invention.

Preferably, the mixture of untreated carrier particles and base is continuously agitated during the reaction to assure that all surfaces of the coatings are contacted by the base and that the degree of reaction is fairly uniform at all surface areas of the coatings.

The untreated carrier particles are also treated with a reducing agent, and optionally an oxidizing agent. This can be most easily accomplished by incorporating the reducing agent and oxidizing agent in the basic solution. Agitation of the reaction mixture is again preferred to ensure a fairly uniform degree of reaction of the untreated carrier particles.

The extent of reaction of the untreated carrier particles can be varied by varying the parameters of the process. For example, degree of reaction and the thickness or depth of the coating effected (these are different parameters) can be increased somewhat by increasing the concentration of base, oxidizing agent, and reducing agent in the treating solution, by lengthening time of treatment, or by raising the temperature of the reactants. Altering the degree of reaction, and, to some extent, the depth thereof, can alter the degree of change in triboelectric charging propensity of the coated carrier particles or the useful life. The optimum time, temperature, and concentrations to be used in any instance will depend upon the particular base, oxidizing agent, reducing agent and untreated particles involved and the particular triboelectric charging propensity desired to be effected.

In a preferred embodiment of the invention, which utilizes oxidizing and reducing agents, undesirable sequestration of the reducing agent by the oxidizing agent is avoided by the use of interconvertable oxidizing and reducing agents. The term "interconvertable" is used herein to designate a relationship between an oxidizing agent and a reducing agent in which the oxidizing agent is a reactant in a reaction or sequence of reactions which yields as one of its products the reducing agent and vice versa.

In a highly preferred embodiment of the invention, the oxidizing agent is selected from peroxydisulfate ($S_2O_8^{2-}$) and peroxymonosulfate ($SO_5^{2-}$) (referred to herein collectively as "persulfate") and the reducing agent is selected from reducing oxosulfur ions. Preferred reducing oxosulfur ions are: $HSO_3^-$, $SO_3^{2-}$, $S_2O_4^{2-}$, $S_2O_5^{2-}$, and $S_2O_7^{2-}$. These oxidizing and reducing agents, in basic solution in the absence of untreated carrier particles, are related by a series of equilibrium reactions. In the method of the invention, the relative concentrations of oxidizing and reducing agents are subject to the same equilibrium processes, however, both oxidizing and reducing agents are also subject to what are believed to be non-reversible reactions with the untreated carrier particles.

The nature of the reaction that occurs between the untreated carrier particles and combination of base and reducing agent; or base, oxidizing and reducing agent, is not completely understood. As the Figures illustrate; base alone, oxidizing agent with base, and reducing agent with base, each produce treated particles of different morphology.

Referring initially to FIGS. 13–16, carrier particles are shown, which are covered with the black spots of fluorohydrocarbon polymer. In addition to the fluorohydrocarbon, small particles appear on the surface of the large carrier particles. The smaller particles are believed to represent fines generated in the process of producing and transporting the carrier. Referring now to FIGS. 17–20, after treatment with base only, very small particles appear on the surface of the carrier. Referring to FIGS. 21–24, after treatment with base and oxidizing agent, great numbers of very fine particles appear and the number of carrier fines appears to be diminished in number.

Referring to FIGS. 1–4, after reacting with reducing agent in a basic solution in accordance with the method of the invention, small particles unlike those in any of FIGS. 13–24 appear. It is difficult to tell if carrier fines are diminished in number. FIGS. 1–4 represent the result of a procedure utilizing only one washing step, if six washes are utilized, the same small particles are still observed, but their numbers are diminished. Referring to FIGS. 5–12, after reacting with reducing agent and oxidizing agent in a basic solution, different small particles appear, which look to be intermediate in size between those seen in FIGS. 17–24 and the small particles of FIGS. 1–4.

The nature of the small particles that appear in the Figures is not well understood, however, it is believed the reaction in the methods of the invention involves both the fluorohydrocarbon coating and the core material of the carrier particles.

For purposes of some of the preferred embodiments, base, and oxidizing and reducing agent concentrations from a trace to about 15 percent by weight of total solution, were found to yield beneficial effects, depending upon the particular base, oxidizing and reducing agents and untreated carrier particles involved.

In a preferred embodiment a time of treatment of about 1 to 2 hours was found to be optimum (in consideration of the depth of polymeric coating material expected to wear away during the otherwise useful life of the carriers in preferred developers), but longer and shorter times can also be preferred in other cases, depending upon the nature of developer, type of development process and apparatus, amount of useful carrier life needed, and so on, that are involved in any particular instance.

Treatment temperatures ranging from room temperature (about 21° C. to 28° C.) to a temperature just below the melting point of the particular polymeric coating involved were found to be useful in some embodiments. With aqueous solvent a convenient temperature range is room temperature to about 100° C. Changing temperature can produce competing effects. Namely, increasing temperature generally tends to produce an increased depth and a higher degree of reaction, but also the closer the temperature is to the melting point of the polymeric coating, the greater the tendency of individual molecules of the polymer to migrate within the coating. Since the reactions occur mainly near the surface of the coating, increased migration will allow molecules of the polymeric coating that have not reacted (or that have reacted to a lesser degree) to migrate toward the surface of the coating, thus tending to lessen the noticeable degree of effective modification near the surface. Therefore it is preferred to keep the temperature of the reactants significantly below the melting point of the polymeric fluorohydrocarbon coating, so as not to undo what one is trying to accomplish. It should be noted that fluorohydrocarbon coatings for carrier particles are already typically chosen such that their melting points are significantly higher than the temperatures likely to be encountered in electrostatographic development, so as not to scum the recording elements or development apparatus which such materials. Thus, no significant reversal of the desirable effects achieved by the present inventive process is likely to occur during normal developer use of the carrier particles after treatment in accordance with the invention. In a particular embodiment of the invention, it was found that a temperature from 50° C. to 70° C. was preferred and a temperature of about 60° C. was more preferred.

Any basic material or combination of basic materials can be employed in the inventive process. For example, good results have been achieved with metal hydroxides, such as KOH and NaOH; ammonium hydroxides, such as $NH_4OH$ and $(CH_3)_4NOH.5H_2O$; amine salts such as $NaNH_2$, and other bases, such as $Na_2CO_3$.

Any oxidizing and reducing agents can be used in the process of the invention, as long as the effect of sequestering of the reducing agent by the oxidizing agent is taken into account. It is highly preferred, as discussed above, that the oxidizing and reducing agents be interconvertable so as to ensure that necessary reactive species will be available during reaction of the untreated carrier particles. It is also preferred that the oxidizing and reducing agents not react adversely with other materials in the reaction mixture.

Useful solutions in the inventive process are aqueous or alcoholic solutions, since water and alcohol aid in solvating and carrying away the hydrogen and fluorine ions removed from the polymeric coatings during the process. Competing considerations are involved in a choice between these materials. Alcoholic or aqueous-/alcoholic solutions demonstrate a superior ability to wet the entire surface of the polymeric fluorohydrocarbon coating during other treatment, however, adverse reactions can occur between oxidizing agent and alcohol. For this reason, in a currently preferred embodiment of the invention, aqueous basic solution is used which does not include alcohol or includes no more than 20 percent (weight/volume) alcohol by weight. In a particular embodiment of the invention the aqueous solution includes 10 to 20 percent (weight/volume) ethanol alcohol. Convenient alcohols include methanol and ethanol. The invention is not limited to aqueous and alcoholic solvents, however, solvents must be carefully chosen to both provide desired solvating capabilities and to not adversely react with other components of the reaction mixture.

The method of the invention is believed to be applicable to any known or new carrier particles having polymeric fluorohydrocarbon coatings on their outer surfaces. Examples of coatings of such particles are poly(-vinylidene fluoride) and copolymers of poly(vinylidene fluoride) and polytetrafluoroethylene, trifluoroethylene or chlorotrifluoroethylene, and mixtures of these. See for example, U.S. Pat. Nos. 4,546,060; 4,478,925; 4,076,857; and 3,970,571. Examples of core materials of such particles include: iron particles such as porous iron particles having oxidized surfaces, steel particles, and other "hard" or "soft" ferromagnetic materials such as gamma ferric oxides or ferrites, such as ferrites of barium, strontium, lead, magnesium, nickel, copper, cobalt, or aluminum. See, for example, U.S. Pat. Nos. 4,042,518; 4,478,925; and 4,546,060.

In a preferred embodiment of the invention, the untreated carrier is strontium ferrite coated with poly(-vinylidene fluoride). The untreated carrier is described herein as being "coated" with polymeric fluorohydrocarbon. The term "coated" should not be understood to suggest or imply that the surface of the carrier cores is completely covered with a uniform layer of polyfluorohydrocarbon. The opposite appears to be the case in all embodiments of the invention. The polyfluorohydrocarbon is coated over the bare cores on a very discontinuous basis such that a very large percentage or most of the core surface remains exposed. This is quite apparent from the photomicrographs presented in the figures. Polyfluorohydrocarbon appears as black blotches on the carrier particles.

In particular embodiments of the invention, the fluorohydrocarbon polymer is coated on an about 0.001 percent to about 5 percent weight/weight basis, or preferably, on a 0.5 percent weight/weight basis. Coating percentages outside this range may be utilized, however, care must be taken to avoid covering an excessive portion of the surface of the cores. A suitable coating percentage can be determined by simple experimentation.

Carrier particles modified by the method of the present invention can be used in combination with a wide variety of toner particles known in the art to be useful in combination with fluorohydrocarbon-coated carrier particles and with any of the sizes and size ratios known to be useful for such particles, to serve as dry electrostatographic developers in any of the well known dry electroscopic development schemes, e.g., cascaded development or magnetic brush development.

In a particular embodiment, the developer of the invention contains from about 1 to about 20 percent by weight of toner and from about 80 to about 99 percent by weight of carrier of the invention. Usually, carrier particles are larger than toner particles. Conventional carrier particles have a particle size of from about 5 to about 1200 micrometers and are generally from 20 to 200 micrometers. Typically, and illustratively, the toner particles have an average diameter between about 2.0 micrometers and about 100 micrometers, and desirably have an average diameter in the range of from about 5.0 micrometers and 30 micrometers for currently used electrostatographic processes.

It is a characteristic of the developer of a preferred embodiment of the invention that the charge development is uniform, that is, that substantially all of the individual toner particles exhibit a triboelectric charge of the same sign with respect to a given carrier. Toner in a preferred embodiment of the invention achieves and maintains a negative charge. It is also preferred that toner throw-off be minimized. The term "toner throw-off" refers to the amount of toner powder thrown out of a developer mix as it is mechanically agitated, for example, within a development apparatus. Throw-off can cause unwanted background development and general contamination problems.

The properties of the thermoplastic polymers employed as the toner matrix phase in the present invention can vary widely. Typically, and preferably, amorphous toner polymers having a glass transition temperature in the range of about 50° C. to about 120° C. or blends of substantially amorphous polymers with substantially crystalline polymers having a melting temperature in the range of about 65° C. to about 200° C. are utilized in the present invention. Preferably, such polymers have a number average molecular weight in the range of about 1000 to about 500,000. The weight average of molecular weight can vary, but preferably is in the range of about $2 \times 10^3$ to about $1 \times 10^6$. Preferably, the thermoplastic polymers used in the practice of this invention are substantially amorphous. However, as indicated above, mixtures of polymers can be employed, if desired, such as mixtures of substantially amorphous polymers with substantially crystalline polymers.

Polymers useful as binders in the toner of the invention include styrenic/acrylic copolymers. In general, preferred styrenic/acrylic copolymers have a glass transition temperature in the range of about 50° C. to about 100° C. In a particular embodiment of the invention, the resin is a copolymer of styrene and butyl acrylate, crosslinked with divinyl benzene; produced in a suspension or emulsion polymerization process. An initiator and, optional, a chain transfer agent are used in the synthesis. The ratio of styrene to butyl acrylate is in the range of from 90:10 to 60:40 and the divinyl benzene is used at a level of 0.1 to 1.0 weight percent.

The toner can include charge control agent in an amount effective to modify, and preferably, improve the properties of the toner. It is preferred that a charge control agent improve the charging characteristics of a toner, so the toner quickly charges to a negative value having a relatively large absolute magnitude and then maintains about the same level of charge. In a preferred embodiment of the invention, the negative charge control agent used is a metal(1-),bis((2-hydroxyphenyl)azo)-2-hydroxynaphthyl (2-)} compound. Specific examples of such compounds include chromate(1-),bis(1-{(5-chloro-2-hydroxyphenyl)azo)-2-naphthalenolato(2-)}, hydrogen, which has the formula

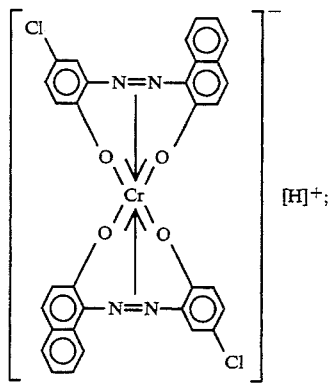

and ferrate(1-),bis{4-{(5-chloro-2-hydroxyphenyl)azo}-3-hydroxy-N-phenyl-2-naphthalenecarboxamidato(2-)}, ammonium, sodium, and hydrogen, which has the formula,

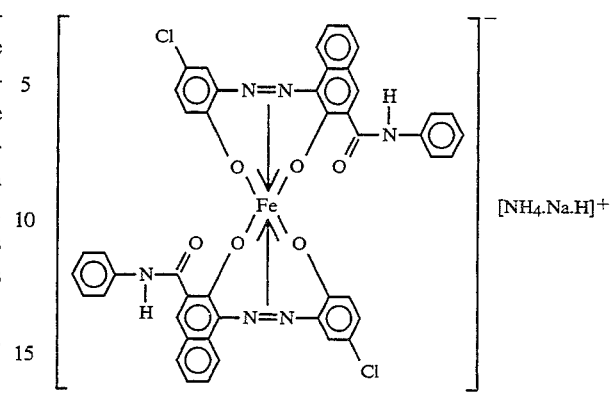

The former charge control agent is marketed by ICI/Zeneca Colours of Wilmington, Del. as CCA-7. The latter charge control agent is marketed by Hodogaya Chemical Co., Ltd. of Toyko, Japan as T-77-M.

An optional component of the toner is colorant: a pigment or dye. Suitable dyes and pigments are disclosed, for example, in U.S. Reissue Pat. No. 31,072 and in U.S. Pat. Nos. 4,160,644; 4,416,965; 4,414,152. One particularly useful colorant for toners to be used in black and white electrostatographic copying machines and printers is carbon black. Colorants are generally employed in the range of from about 1 to about 30 weight percent on a total toner powder weight basis, and preferably in the range of about 2 to about 15 weight percent.

The toner can also contain other additives of the type used in previous toners, including leveling agents, surfactants, stabilizers, and the like. The total quantity of such additives can vary. A present preference is to employ not more than about 10 weight percent of such additives on a total toner powder composition weight basis.

Suitable dry styrenic/acrylic copolymer toners can optionally incorporate a small quantity of low surface energy material in combination with toner particles comprised of polyester polymer, as described in U.S. Pat. Nos. 4,517,272 and 4,758,491. Optionally the toner can contain a particulate additive on its surface such as the particulate additive disclosed in U.S. Pat. No. 5,192,637.

The charge control agent and other addenda can be added to the toner in a number of ways. For example, in a dry electrostatographic toner, the charge control agent can be mix-blending in the manner described in U.S. Pat. Nos. 4,684,596 and 4,394,430, with an appropriate polymeric binder material and any other desired addenda. The mixture is then ground to desired particle size to form a free-flowing powder of toner particles containing the charge agent. A preformed mechanical blend of particulate polymer particles, charge control agent, colorants and additives can, alternatively, be roll milled or extruded at a temperature sufficient to melt blend the polymer or mixture of polymers to achieve a uniformly blended composition. The resulting material, after cooling, can be ground and classified, if desired, to achieve a desired toner powder size and size distribution. For a polymer having a $T_g$ in the range of about 50° C. to about 120° C., or a $T_m$ in the range of about 65° C. to about 200° C., a melt blending temperature in the range of about 90° C. to about 240° C. is suitable using a roll mill or extruder. Melt blending times, that is, the exposure period for melt blending at elevated temperature, are in the range of about 1 to about 60 minutes. After melt blending and cooling, the composition can be stored before being ground. Grinding can be carried out by any convenient procedure. For example, the solid composition can be crushed and then ground using, for example, a fluid energy or jet mill, such as described in U.S. Pat. No. 4,089,472. Classification can be accomplished using one or two steps.

In place of mix or melt blending, the polymer can be dissolved in a solvent in which the charge control agent and other additives are also dissolved or are dispersed. The resulting solution can be spray dried to produce particulate toner powders. Limited coalescence polymer suspension procedures as disclosed in U.S. Pat. No. 4,833,060 are particularly useful for producing small sized, uniform toner particles.

The toner and developer of the invention can be used in a variety of ways to develop electrostatic charge patterns or latent images. Such developable charge patterns can be prepared by a number of means can be carried, for example, on a light sensitive photoconductive element or a non-light-sensitive dielectric surface element, such as an insulator coated conductive sheet. One suitable development technique involves cascading developer across the electrostatic charge pattern. Another technique involves applying toner particles from a magnetic brush. This technique involves the use of magnetically attractable carrier cores. After imagewise deposition of the toner particles the image can be fixed, for example, by heating the toner to Cause it to fuse to the substrate carrying the toner. If desired, the unfused image can be transferred to a receiver such as a blank sheet of copy paper and then fused to form a permanent image.

The following Examples and Comparative Examples are presented to further illustrate some preferred modes of practice of the method of the invention and to compare the triboelectric properties of inventive carrier particles produced by the inventive method to those properties of similar carrier particles not treated in accordance with the invention.

Unless otherwise indicated, all starting materials were commercially obtained. Styrene-co-butylacrylate-co-divinyl benzene binder polymer was produced in accordance with the method described in U.S. Pat. No. 4,833,060. In the tables, "Ex" and "Com Ex" indicate the Example or Comparative Example number and "T.O." is throwoff.

EXAMPLES

Examples 1a, 1b, 1c

Preparation of Untreated, Coated Carrier

Untreated, coated carrier particles were prepared by mixing 0.5 grams of 0.3 micrometer poly(vinylidene fluoride) powder marketed by Pennwalt Corp. as Kynar 301F, and 100 grams of bare (uncoated) strontium ferrite core particles. The mixture was placed in a bottle and rolled on a roll mill for 1 hour to thoroughly disperse the polymer over the surface of the carrier. The mixture was then cured at 230° C. for 2.5 hours to fuse the polymer to the surface of the particles. The volume average particle size of the carrier particles was from about 25 to 35 micrometers.

Treatment of Carrier

Distilled water (150 ml), KOH (6 grams) and 6 grams of the reducing agent, $Na_2SO_3$, were combined in a 500 ml three-neck flask. The flask was fitted with a stirrer, sealed from the ambient atmosphere, and placed in a 60° C. water bath. Untreated, coated carrier (100 grams) was then added and the mixture was allowed to stir for 2 hours. The resulting liquid was then filtered off and the particles were washed with 900 ml of water, six times. The particles were collected and allowed to dry at 60° C. and were then allowed to cool.

Preparation Of Toner

A dry blend of 100 parts per hundred (pph) of styrene-co-butylacrylate-co-divinyl benzene (77 parts:23 parts:0.3 parts) binder polymer and 2 pph of the charge control agent CCA-7 and 6 pph Regal 300 TM carbon black, marketed by Cabot Corp., was added to a heated two-roll compounding mill. The roller surfaces were set to 150° C. The melt was exercised on the mill for 15 minutes, then was removed and cooled. The resulting slab was first coarse ground to 2 mm size on a laboratory mill, then finely pulverized to approximately 12 micrometer size on a Trost TX jet mill.

Preparation of Developer

Developer was prepared by mixing toner particles prepared as described above at a weight concentration of 12% toner with the carrier particles.

Evaluation of Toner Charging

Toner charge was measured, at 50 percent relative humidity, in microcoulombs per gram of toner ($\mu c/g$) in a "MECCA device", that is, a magnetic electrostatic charge concentration apparatus, for two "exercise" time periods, designated "3 min. Q/m" and "10 min. Q/m" in Tables 1 and 2. Prior to measuring the toner charge, the carrier was vigorously shaken or "exercised" with toner to cause triboelectric charging by placing a 4 gram sample of developer (3.52 g magnetized carrier, 0.48 g toner) into a 4 dram glass screw cap vial, capping the vial and shaking the vial on a "wrist-action" robot shaker operated at about 2 Hertz and an overall amplitude of about 11 cm for 3 minutes. Toner charge level after shaking was then measured by placing a 100 milligram sample of the charged developer in a MECCA apparatus and measuring the charge and mass of transferred toner in the MECCA apparatus. This involves placing the 100 milligram sample of the charged developer in a sample dish situated between electrode plates and subjecting it, simultaneously for 30 seconds, to a 60 Hz magnetic field of about 2000 volts/cm between the plates. The toner is released from the carrier and is attracted to and collects on the plate having polarity opposite to the toner charge. The total toner charge is measured by an electrometer connected to the plate, and that value is divided by the weight of the toner on the plate to yield the charge per mass of toner (Q/m). This measurement represents "3 min Q/m"

The toner charge level (i.e., charge-to-mass ratio) was also taken after exercising the developer for an additional 10 minutes by placing the magnetized developer in a glass bottle on top of a cylindrical roll with rotating magnetic core rotating at 2000 revolutions per minute. This closely approximates typical actual usage of the developer in an electrostatographic development process. After this additional 10 minute exercising, the toner charge was measured in a MECCA apparatus. This measurement represents "10 min. Q/m".

The 3 min. and 10 min. charge levels were measured for carrier subject to three aging periods: (a) no aging, (b) 16 hours 1 "overnight", and (c) 2 "overnights";

designated "No Aging", "10.N.", and "2 O.N." in the tables). The 1 overnight aging was provided by exercising, the same manner as described above, a fresh sample of 6 grams of developer (5.28 g magnetized carrier, 0.72 g toner) in a 4 dram glass screw cap vial, for 16 hours. The developer was then electrically stripped in a 5.5 Kv field to remove essentially all of the exercised toner. The 3 min. and 10 min. Q/m measurements were then taken in the same manner as above described and throw-off was measured as below described. The developer was then stripped in a 5.5 Kv field and the 10.N. 16 hour aging was repeated followed again by developer strip and rebuild and by 3 min. and 10 min. Q/m measurements and throw-off testing. Values are reported in Table 1.

Evaluation of Throw-Off

Throw-off values (T.O.) were determined, at 50 percent relative humidity, by taking the 4 gram developer sample at 12% toner concentration that had been exercised for 10 minutes admixing in 6% more toner to provide a final toner concentration of about 18%), followed by a 15 second shake on the wrist action shaker. This developer was then placed on a roll containing a rotating magnetic core, similar to a magnetic brush roll used for electrostatic development. A plexiglass housing contained the assembly, and had a vacuum filter funnel mounted directly over the roll. The weight of toner, in milligrams, collected on a piece of filter paper after one minute of running the magnetic core at 2000 revolutions per minute was reported as the throw-off value.

Results are presented in Table 1.

Examples 2a, 2b, 2c–8a, 8b, 8c

The same procedures were substantially followed as described in Examples 1a, 1b and 1c except that the treatment agents were different as indicated in Table 1. Scanning electron micrographs of carrier prepared in accordance with Examples 8a–8c appears in FIGS. 5–8.

Example 9

The same procedures were substantially followed as in Examples 2a–2c except that one washing was performed rather than six. Scanning electron photomicrographs appear in FIGS. 1–4.

Example 10

The same procedures were substantially followed as in Examples 8a–8c except that the ratio of $Na_2S_2O_8$ to $Na_2S_2O_5$ was one to one. Scanning electron photomicrographs appear in FIGS. 9–12.

Examples 11a, 11b, 11c–12a, 12b, 12c

The same procedures were substantially followed as described in Examples 1a, 1b, 1c except that the treatment agents were different as indicated in Table 1 and the relative humidity during evaluations was 35 percent.

COMPARATIVE EXAMPLES

Comparative Examples 1A, 1B, 1C–14A, 14B, 14C

Toners and developers were prepared and evaluated in the same manner as in the Examples, with the exceptions that in Comparative Examples 1A, 1B, 1C–12A, 12B, 12C the reaction flask was open to the ambient atmosphere and evaluation of the toner charging characteristics was conducted at about 15–25 percent relative humidity and Comparative Examples 14A, 14B, 14C included as oxidizing agent OXONE TM monopersulfate compound; produced by E.I. dupont de Nemours & Co., Inc., and marketed by Aldrich Chemical Company, Inc. of Milwaukee, Wis. as "$2KHSO_5.KHSO_4.K_2SO_4$"; and were evaluated at 35 percent relative humidity. Comparative Examples 13A, 13B, and 13C were evaluated at 50 percent relative humidity. Results are reported in Table 2, except for Comparative Example 13, which is reported in Table 1 for convenience in comparing results. Treatments were modified or eliminated as indicated in Tables 1–2. Scanning electron micrographs of carriers prepared in accordance with Comparative Examples 1A–1C, 2A–2C, and 7A–7C appear in FIGS. 13–24.

TABLE 1

| Ex or Com Ex | Treatment | Aging cycle | Q/m 3 min | Q/m 10 min | T.O. (mg admix) |
| --- | --- | --- | --- | --- | --- |
| Com Ex 13A | basic-oxid 4% KOH 4% $Na_2S_2O_8$ | NO AGING | −38.1 | −52.7 | 0.1 |
| Com Ex 13B | basic-oxid 4% KOH 4% $Na_2S_2O_8$ | 1 O.N. | −23.1 | −33.2 | 1.7 |
| Com Ex 13C | basic-oxid 4% KOH 4% $Na_2S_2O_8$ | 2 O.N. | −19.7 | −31.6 | 11.4 |
| Ex 1a | basic-reduc 4% KOH 4% $Na_2SO_3$ | NO AGING | −23.7 | −20.7 | 1.4 |
| Ex 1b | basic-reduc 4% KOH 4% $Na_2SO_3$ | 1 O.N. | −18.8 | −28.4 | 5.8 |
| Ex 1c | basic-reduc 4% KOH 4% $Na_2SO_3$ | 2 O.N. | −19.6 | −31.6 | 11.4 |
| Ex 2a | basic-reduc 4% KOH 4% $NaHSO_3$ | NO AGING | −19.3 | −14.7 | 2.8 |
| Ex 2b | basic-reduc 4% KOH 4% $NaHSO_3$ | 1 O.N. | −19.2 | −28.4 | 5.8 |
| Ex 2c | basic-reduc 4% KOH 4% $NaHSO_3$ | 2 O.N. | −19.8 | −26.7 | 21.7 |
| Ex 3a | basic-reduc 4% KOH 4% $Na_2S_2O_3$ | NO AGING | −23.4 | −24.0 | 2.0 |
| Ex 3b | basic-reduc 4% KOH 4% $Na_2S_2O_3$ | 1 O.N. | −18.7 | −31.3 | 4.9 |
| Ex 3c | basic-reduc 4% KOH 4% $Na_2S_2O_3$ | 2 O.N. | −18.3 | −25.0 | 16.5 |
| Ex 4a | basic-reduc 4% KOH 4% $Na_2S_2O_4$ | NO AGING | −20.2 | −18.5 | 1.6 |

TABLE 1-continued

| Ex or Com Ex | Treatment | Aging cycle | Q/m 3 min | Q/m 10 min | T.O. (mg admix) |
|---|---|---|---|---|---|
| Ex 4b | basic-reduc 4% KOH 4% $Na_2S_2O_4$ | 1 O.N. | −18.3 | −25.2 | 4.2 |
| Ex 4c | basic-reduc 4% KOH 4% $Na_2S_2O_4$ | 2 O.N. | −19.5 | −26.2 | 12.1 |
| Ex 5a | basic-reduc 4% KOH 4% $Na_2S_2O_5$ | NO AGING | −23.3 | −18.5 | 1.3 |
| Ex 5b | basic-reduc 4% KOH 4% $Na_2S_2O_5$ | 1 O.N. | −18.3 | −25.8 | 5.8 |
| Ex 5c | basic-reduc 4% KOH 4% $Na_2S_2O_5$ | 2 O.N. | −19.0 | −26.1 | 16.7 |
| Ex 6a | basic-oxid + reduc 4% KOH 4% (2 parts $Na_2S_2O_8$ + 1 part $NaHSO_3$) | NO AGING | −23.5 | −21.5 | 1.2 |
| Ex 6b | basic-oxid + reduc 4% KOH 4% (2 parts $Na_2S_2O_8$ + 1 part $NaHSO_3$) | 1 O.N. | −20.3 | −30.2 | 6.1 |
| Ex 6c | basic-oxid + reduc 4% KOH 4% (2 parts $Na_2S_2O_8$ + 1 part $NaHSO_3$) | 2 O.N. | −20.0 | −28.9 | 19.7 |
| Ex 7a | basic-oxid + reduc 4% KOH 4% (2 parts $Na_2S_2O_8$ + 1 part $Na_2S_2O_4$) | NO AGING | −30.0 | −31.5 | 0.8 |
| Ex 7b | basic-oxid + reduc 4% KOH 4% (2 parts $Na_2S_2O_8$ + 1 part $Na_2S_2O_4$) | 1 O.N. | −21.6 | −31.3 | 3.2 |
| Ex 7c | basic-oxid + reduc 4% KOH 4% (2 parts $Na_2S_2O_8$ + 1 part $Na_2S_2O_4$) | 2 O.N. | −20.3 | −27.0 | 10.2 |
| Ex 8a | basic-oxid + reduc 4% KOH 4% (2 parts $Na_2S_2O_8$ + 1 part $Na_2S_2O_5$) | NO AGING | −25.6 | −26.3 | 0.5 |
| Ex 8b | basic-oxid + reduc 4% KOH 4% (2 parts $Na_2S_2O_8$ + 1 part $Na_2S_2O_5$) | 1 O.N. | −20.6 | −28.8 | 3.0 |
| Ex 8c | basic-oxid + reduc 4% KOH 4% (2 parts $Na_2S_2O_8$ + 1 part $Na_2S_2O_5$) | 2 O.N. | −20.7 | −30.6 | 7.4 |
| Ex 11a | basic-reduc 4% KOH 4% $K_2S_2O_7$ | NO AGING | −22.2 | −22.4 | 1.3 |
| Ex 11b | basic-reduc 4% KOH 4% $K_2S_2O_7$ | 1 O.N. | −19.7 | −30.9 | 8.3 |
| Ex 11c | basic-reduc 4% KOH 4% $K_2S_2O_7$ | 2 O.N. | −18.3 | −26.7 | 17.0 |
| Ex 12a | basic-oxid + reduc 4% KOH 4% (2 parts $Na_2S_2O_8$ + 1 part $K_2S_2O_7$) | NO AGING | −29.7 | −40.2 | 0.8 |
| Ex 12b | basic-oxid + reduc 4% KOH 4% (2 parts $Na_2S_2O_8$ + 1 part $K_2S_2O_7$) | 1 O.N. | −22.3 | −32.6 | 5.3 |
| Ex 12c | basic-oxid + reduc 4% KOH 4% (2 parts $Na_2S_2O_8$ + 1 part $K_2S_2O_7$) | 2 O.N. | −19.1 | −28.1 | 19.2 |

TABLE 2

| Ex or Com Ex | Treatment | Aging cycle | Q/m 3 min | Q/m 10 min | T.O. (mg admix) |
|---|---|---|---|---|---|
| Com Ex 1A | no treatment | NO AGING | −8.0 | −30.1 | 39.0 |
| Com Ex 1B | no treatment | 1 O.N. | −18.9 | −32.4 | 38.9 |
| Com Ex 1C | no treatment | 2 O.N. | −16.6 | −24.8 | 37.0 |
| Com | basic 4% KOH | NO | −23.9 | −24.1 | 3.3 |

TABLE 2-continued

| Ex or Com Ex | Treatment | Aging cycle | Q/m 3 min | Q/m 10 min | T.O. (mg admix) |
|---|---|---|---|---|---|
| Com Ex 2A | basic 4% KOH | AGING | −21.9 | −35.2 | 10.6 |
| Com Ex 2B | basic 4% KOH | 1 O.N. | −18.9 | −25.0 | 25.9 |
| Com Ex 2C | basic 4% KOH | 2 O.N. | −22.0 | −31.5 | 0.2 |
| Com Ex 3A | basic-oxid 4% KOH 2% KMnO₄ | NO AGING | −23.2 | −30.0 | 2.5 |
| Com Ex 3B | basic-oxid 4% KOH 2% KMnO₄ | 1 O.N. | −20.7 | −31.0 | 8.4 |
| Com Ex 3C | basic-oxid 4% KOH 2% KMnO₄ | 2 O.N. | −16.9 | −20.8 | 7.0 |
| Com Ex 4A | basic-oxid 4% KOH 4% KClO₄ | NO AGING | −24.2 | −31.5 | 2.1 |
| Com Ex 4B | basic-oxid 4% KOH 4% KClO₄ | 1 O.N. | −25.0 | −36.3 | 9.3 |
| Com Ex 4C | basic-oxid 4% KOH 4% KClO₄ | 2 O.N. | −17.6 | −23.1 | 1.2 |
| Com Ex 5A | basic-oxid 4% KOH 4% KNO₃ | NO AGING | −24.2 | −33.7 | 2.0 |
| Com Ex 5B | basic-oxid 4% KOH 4% KNO₃ | 1 O.N. | −25.0 | −36.3 | 9.3 |
| Com Ex 5C | basic-oxid 4% KOH 4% KNO₃ | 2 O.N. | −26.8 | −33.7 | 0.7 |
| Com Ex 6A | basic-oxid 4% KOH 4% H₂O₂ | NO AGING | −26.3 | −34.7 | 2.4 |
| Com Ex 6B | basic-oxid 4% KOH 4% H₂O₂ | 1 O.N. | −24.3 | −33.9 | 7.3 |
| Com Ex 6C | basic-oxid 4% KOH 4% H₂O₂ | 2 O.N. | −28.4 | −37.5 | 0.4 |
| Com Ex 7A | basic-oxid 4% KOH 4% Na₂S₂O₈ | NO AGING | −26.3 | −34.0 | 2.1 |
| Com Ex 7B | basic-oxid 4% KOH 4% Na₂S₂O₈ | 1 O.N. | −24.4 | −33.5 | 5.2 |
| Com Ex 7C | basic-oxid 4% KOH 4% Na₂S₂O₈ | 2 O.N. | −31.4 | −35.2 | 0.4 |
| Com Ex 8A | basic-oxid 4% KOH 4% NaOCl | NO AGING | −25.1 | −30.8 | 1.7 |
| Com Ex 8B | basic-oxid 4% KOH 4% NaOCl | 1 O.N. | −23.4 | −32.1 | 6.5 |
| Com Ex 8C | basic-oxid 4% KOH 4% NaOCl | 2 O.N. | −27.6 | −31.9 | 0.3 |
| Com Ex 9A | basic-oxid 4% NaOCl | NO AGING | −25.3 | −33.6 | 2.2 |
| Com Ex 9B | basic-oxid 4% NaOCl | 1 O.N. | −24.8 | −33.8 | 4.8 |
| Com Ex 9C | basic-oxid 4% NaOCl | 2 O.N. | −43.3 | −49.0 | 0.1 |
| Com Ex 10A | basic-oxid 4% KOH 4% NaBO₃·H₂O | NO AGING | −24.8 | −31.7 | 1.6 |
| Com Ex 10B | basic-oxid 4% KOH 4% NaBO₃·H₂O | 1 O.N. | −20.0 | −26.7 | 1.9 |
| Com Ex 10C | basic-oxid 4% KOH 4% NaBO₃·H₂O | 2 O.N. | −19.3 | −35.6 | 0.3 |
| Com Ex 11A | basic-oxid 4% KOH 4% (NH₄)₂Ce(NO₃)₆ | NO AGING | −18.8 | −24.4 | 4.5 |
| Com Ex 11B | basic-oxid 4% KOH 4% (NH₄)₂Ce(NO₃)₆ | 1 O.N. | −21.1 | −27.0 | 5.5 |
| Com Ex 11C | basic-oxid 4% KOH 4% (NH₄)₂Ce(NO₃)₆ | 2 O.N. | −28.1 | −35.7 | 1.2 |
| Com Ex 12A | basic-oxid 4% KOH 2.7% benzoyl peroxide | NO AGING | −19.5 | −30.8 | 4.2 |
| Com Ex 12B | basic-oxid 4% KOH 2.7% benzoyl peroxide | 1 O.N. | −21.0 | −29.4 | 9.0 |
| Com Ex 12C | basic-oxid 4% KOH 2.7% benzoyl peroxide | 2 O.N. | −35.3 | −26.5 | 0.1 |
| Com Ex 14a | basic-oxid 4% KOH 4% OXONE ™ | NO AGING | −22.7 | −31.7 | 2.5 |
| Com Ex 14b | basic-oxid 4% KOH 4% OXONE ™ | 1 O.N. | −20.3 | −29.0 | 9.6 |
| Com Ex 14c | basic-oxid 4% KOH 4% OXONE ™ | 2 O.N. | | | |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for modifying the triboelectric charging propensity of particles coated with fluorohydrocarbon polymer for use as carriers in electrostatographic development, said method comprising contacting said particles with a basic solution including a reducing agent for said particles.

2. The method of claim 1 wherein said solution is aqueous.

3. The method of claim 1 wherein said contacting step further comprises maintaining said particles in said basic solution at a temperature from room temperature to about 100° C.

4. The method of claim 1 wherein said contacting step further comprises maintaining said particles in said basic solution at a temperature from 50° C. to 70° C.

5. The method of claim 1 wherein said particles have ferrite cores.

6. The method of claim 1 wherein said fluorohydrocarbon is poly(vinylidene fluoride).

7. The method of claim 1 wherein said reducing agent is one or more sulfur reducing ions said base is one or more hydroxides.

8. The method of claim 7 wherein said reducing agent is $HSO_3-$, $SO_3^{2-}$, $S_2O_3^{2-}$, $S_2O_4^{2-}$, $S_2O_5^{2-}$, or $S_2O_7^{2-}$.

9. The method of claim 1 wherein said particles have strontium ferrite cores and said contacting step further comprises maintaining said particles in an aqueous solution of hydroxide and sulfur reducing ion at a temperature of from 50° C. to 70° C. for from 1 to 3 hours.

10. A carrier produced by the method of claim 1.

11. A method for modifying the triboelectric charging propensity of particles coated with fluorohydrocarbon polymer for use as carriers in electrostatographic development, said method comprising contacting said particles with a basic solution including an oxidizing agent for said particles and a reducing agent for said particles.

12. The method of claim 11 wherein said oxidizing agent and said reducing agent are interconvertable, within said basic solution, by one or more oxidation-reduction reactions.

13. The method of claim 11 wherein said solution is aqueous and said contacting step further comprises maintaining said particles in said basic solution at a temperature from room temperature to about 100° C.

14. The method of claim 11 wherein said contacting step further comprises maintaining said particles in said basic solution at a temperature from 50° C. to 70° C.

15. The method of claim 11 wherein said particles have ferrite cores.

16. The method of claim 11 wherein said fluorohydrocarbon is poly(vinylidene fluoride).

17. The method of claim 11 wherein said reducing agent is one or more sulfur reducing ions, said oxidizing agent is one or more peroxysulfates and said base is one or more hydroxides.

18. The method of claim 17 wherein said reducing agent is $HSO_3-$, $SO_3^{2-}$, $S_2O_4^{2-}$, $S_2O_5^{2-}$, or $S_2O_7^{2-}$ and said oxidizing agent is peroxydisulfate.

19. The method of claim 11 wherein said particles have strontium ferrite cores and said contacting step further comprises maintaining said particles in an aqueous solution of potassium hydroxide, peroxydisulfate, and sulfur reducing ions at a temperature of from 50° C. to 70° C. for from 1 to 3 hours.

20. A carrier produced by the method of claim 11.

21. An electrostatographic developer comprising toner and carrier particles produced by contacting fluorhydrocarbon coated particles with a basic solution including a reducing agent for said particles, said toner including binder selected from the group consisting of styrene-butyl-acrylate copolymers.

22. A method for developing latent images comprising forming an electrostatic latent image with the developer defined by claim 21, followed by transferring the image to a suitable substrate and permanently affixing the image thereto.

23. An electrostatic developer comprising toner particles and the carrier particles of claim 10, said toner particles including binder selected from the group consisting of styrene-butyl-acrylate copolymers.

24. A method for developing latent images comprising forming an electrostatic latent image with the developer defined in claim 23, followed by transferring the image to a suitable substrate and permanently affixing the image thereto.

* * * * *